Nov. 2, 1965 C. W. YONG 3,215,781

INTERCOMMUNICATION SYSTEM

Filed July 30, 1962 4 Sheets-Sheet 1

INVENTOR.
CALVIN W. YONG
BY Mason, Kolehmainen, Rathburn and Wyss
ATTORNEYS

INVENTOR.
CALVIN W. YONG
BY
Mason, Kolehmainen, Rathburn and Wyss
ATTORNEYS

Nov. 2, 1965 C. W. YONG 3,215,781

INTERCOMMUNICATION SYSTEM

Filed July 30, 1962

4 Sheets-Sheet 3

INVENTOR.
CALVIN W. YONG

BY *Mason, Kolehmainen, Rathburn and Wyss*

ATTORNEYS

INVENTOR.
CALVIN W. YONG
BY
Mason, Kolehmainen, Rathburn and Wyss.
ATTORNEYS 3,215,781
INTERCOMMUNICATION SYSTEM
Calvin W. Yong, Indianapolis, Ind., assignor to Webster Electric Company, Racine, Wis., a corporation of Delaware
Filed July 30, 1962, Ser. No. 213,408
16 Claims. (Cl. 179—1)

Figures 1, 5:
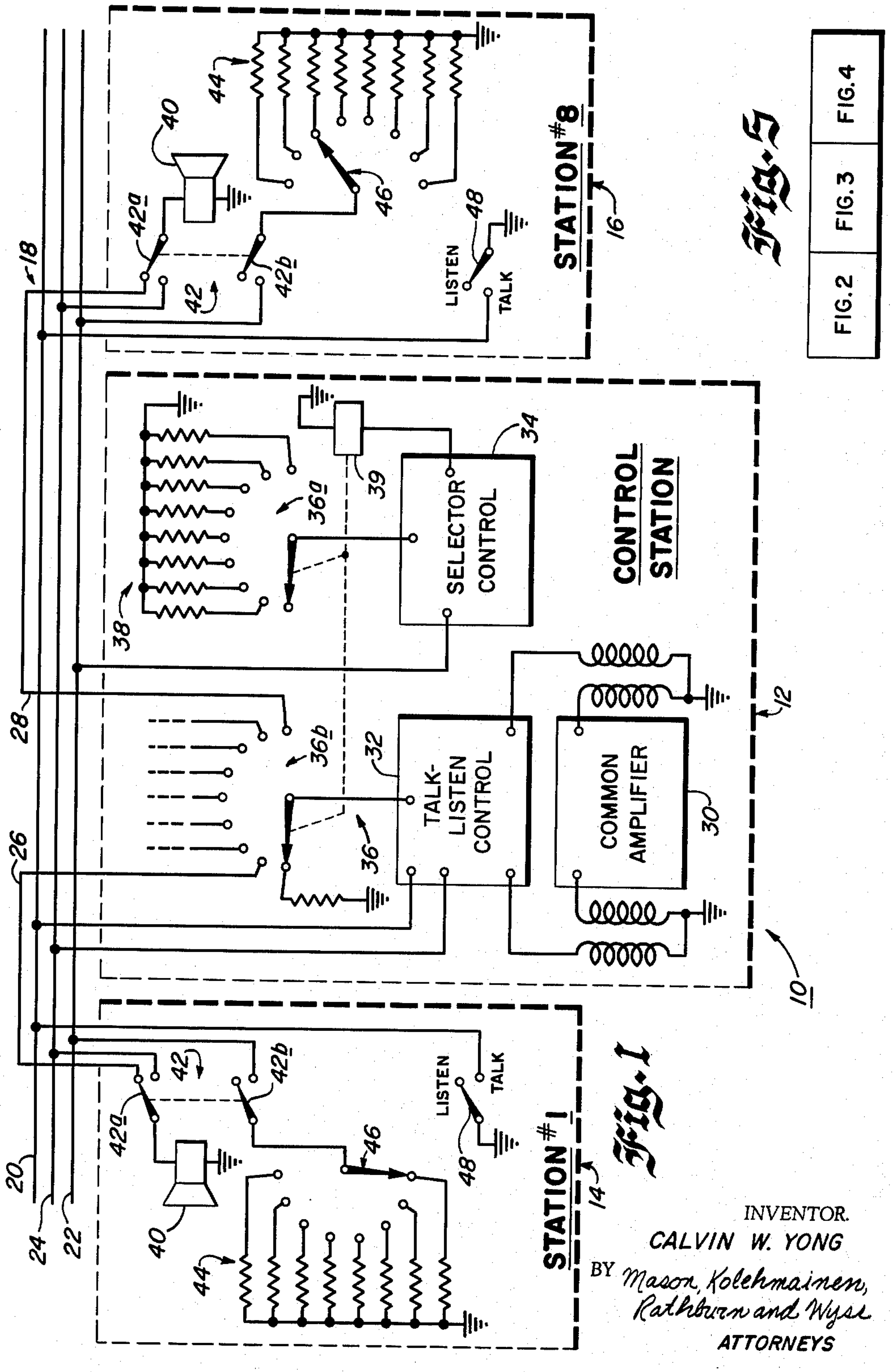

This invention relates to an intercommunication system and, more particularly, to an intercommunication system with a plurality of stations using a common remote amplifying means.

Many known intercommunication systems having a plurality of remote stations require the use of separate amplifying means individual to each of the stations with the result that the initial system cost and the cost of operating and maintaining the system often limits their use. An attempt has been made in some systems to overcome these disadvantages by providing a common or central amplifier remote from the stations used in the communication path between any pair or group of the stations. However, these prior common amplifier systems are not satisfactory in some applications because the station selecting means and the controls for the amplifying means often require excessive cabling and have elaborate controls and switches.

Accordingly, one object of the present invention is to provide a new and improved intercommunication system.

Another object is to provide a new and improved intercommunication system having a common or central amplifying means.

A further object is to provide a common amplifier intercommunication system including new and improved station selecting means.

A further object is to provide a common amplifier intercommunication system that uses a minimum amount of cabling for interconnecting the remote stations with a central control means including the common amplifier.

Another object is to provide a common amplifier intercommunication system including new and improved means for establishing voice communication paths between calling and called stations.

Another object is to provide a common amplifier intercommunication system including new and improved means for providing busy indications at the stations.

In accordance with these and many other objects, an embodiment of the invention comprises an intercommunication system including a plurality of stations and a central station or common control means. The plurality of stations and the common control means are interconnected by a signaling link including a common control channel, a common selecting channel, a common voice channel, and a plurality of additional voice channels each individual to one of the stations. The common control means includes a common amplifier that forms a part of each communication path extended between any pair of the stations and a common selecting means controllable over the signaling link from a calling station for establishing a communication path including the common amplifying means to any called one of the remaining stations. The common control means also includes means for rendering the selecting means ineffective when a communication path has been established, means for establishing a busy indication at all of the stations when a path has been established, and means controllable from the stations over the control channel for reversing the connection of the calling and called stations to the common amplifying means.

The selecting means comprises a switching means controlled by a bridge network including a pair of controlled conduction devices each having a control electrode. One of the control electrodes is adapted to be connected by the switching means to any one of a plurality of different value impedance elements, and the control electrode of the other controlled conduction device is connected to the common selecting channel. When a call is placed from one of the stations, a switching means is operated at the calling station to connect a impedance of a particular value representing the called station to the selecting channel. This unbalances the bridge network in the common control unit so that the stepping switch is advanced to a setting in which an impedance element of a value equal or proportional to the value selected at the calling station is connected to the control electrode of the other controlled conduction device in the bridge network. This rebalances the bridge and arrests further operation of the switching means.

In this setting, the switching means completes a communication path between the calling and called station which path includes a connection from the calling station over the common voice channel to the output of the common amplifying means and a connection to the input of the common amplifying means over the voice channel selected by the switching means that is individual to the called station. A control means operated by the connection of the impedance means to the selecting channel at the calling station is effective when the communication path is established to enable transmission over the common voice channel, to disable the selecting means, and to forward a busy indication over all of the individual voice channels to all of the stations. The calling and called stations also include an additional manually actuated switching means that is operable over the common control channel to actuate a talk-listen switching means in the common control means so that the direction of communication over the established path can be reversed by reversing the connections to the common amplifying means.

When the established communication path is released by disconnecting the selected impedance means from the selecting channel at the calling station, the bridge network is unbalanced and returns to a normal condition. At this time, the busy indication is removed, the common voice channel is disabled, and the selecting means is returned to an effective condition in which it is responsive to the subsequent connection of different value impedance elements to the common selecting channel.

Figure 2:
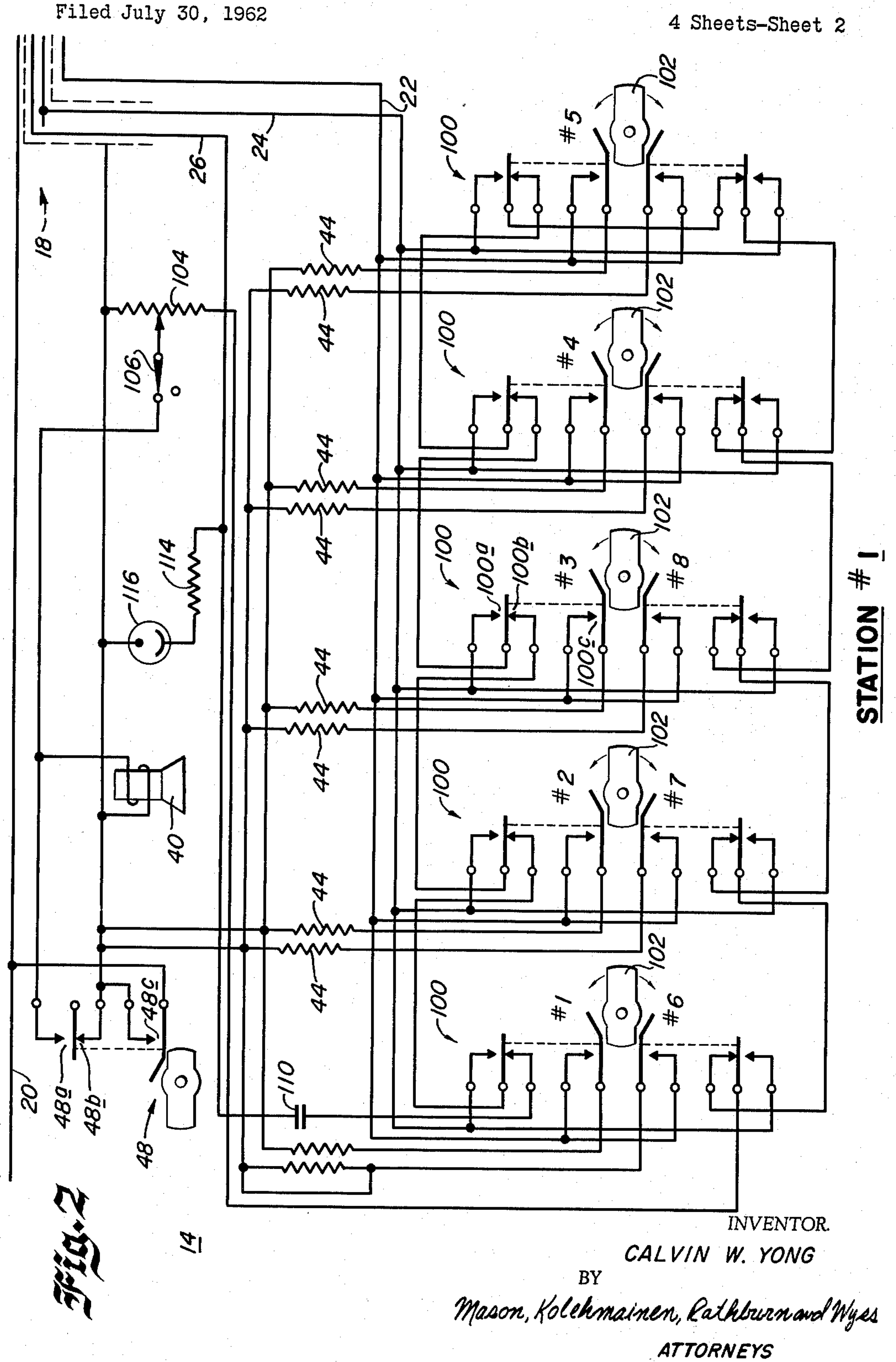
Figure 3:
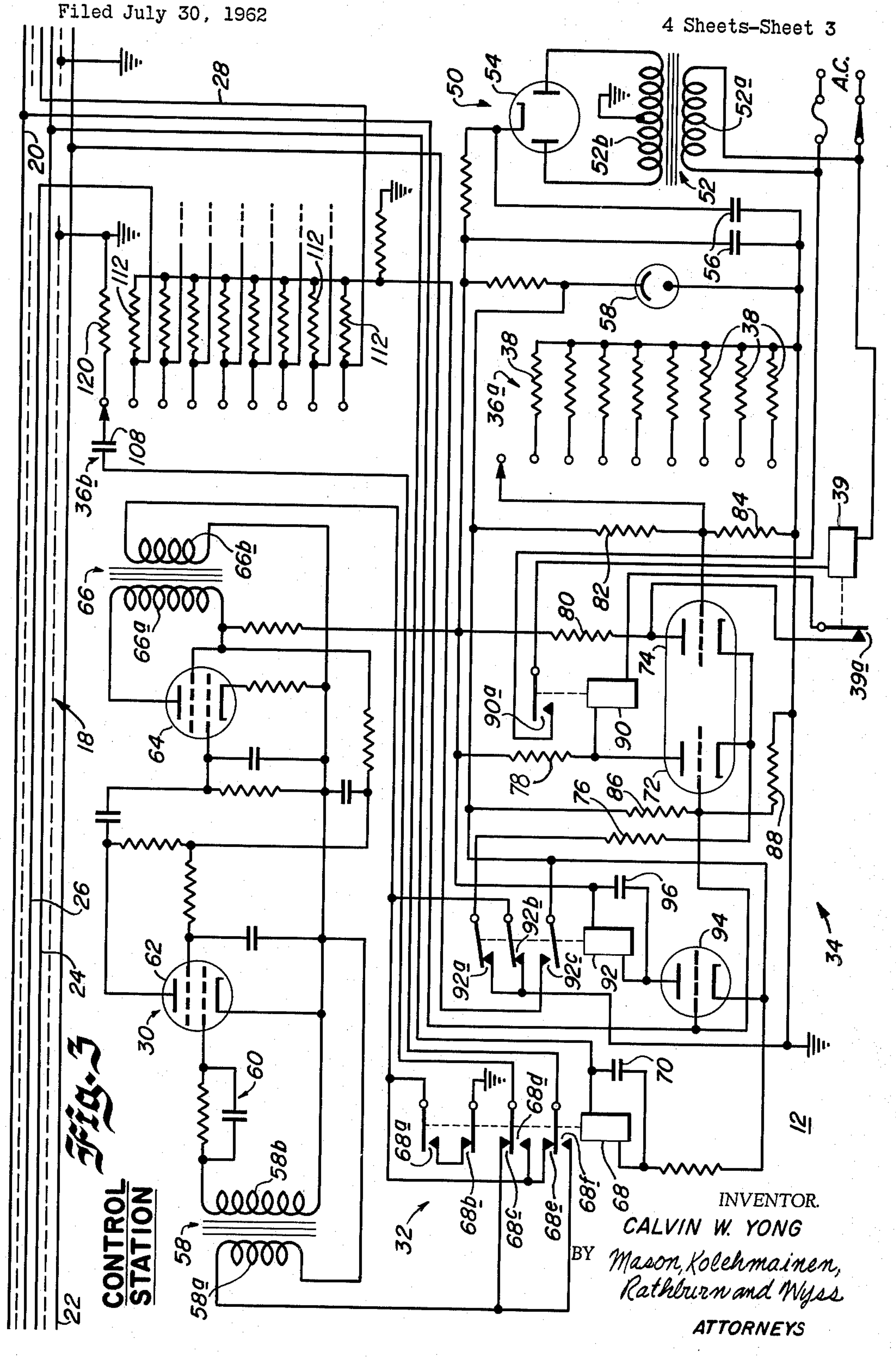
Figure 4:
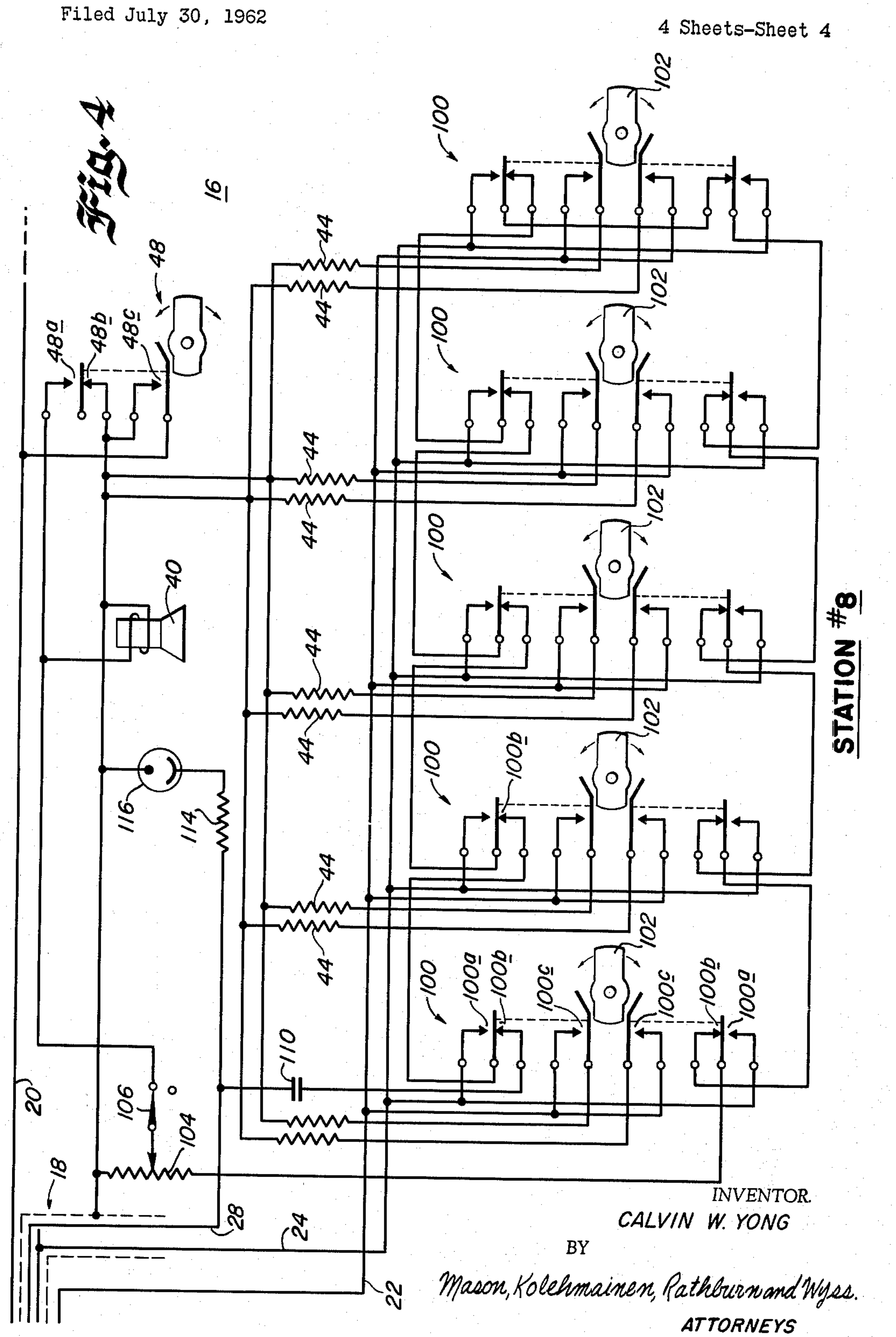

Many other objects and advantages of the present invention will become apparent from considering the following detailed description in conjunction with the drawings in which:

FIG. 1 is a block diagram illustrating an intercommunication system embodying the present invention;

FIGS. 2–4 form a schematic diagram of the intercommunication system shown in FIG. 1; and FIG. 5 is a block diagram illustrating the manner in which FIGS. 2, 3 and 4 are laid side by side to form the complete schematic diagram of the intercommunication system shown in FIG. 1.

Referring now more specifically to FIG. 1 of the drawings, therein is illustrated a central amplifier intercommunication system which embodies the present invention and which is indicated generally as 10. The system includes a common control station or control unit 12 and a plurality of remote stations, such as a pair of illustrated stations 14 and 16. The stations 14 and 16 and the common control unit 12 are interconnected by a signaling link or cable 18 that includes a common control channel 20, a common selecting channel 22, a common voice channel 24, and a plurality of additional voice channels each individual to one of the stations. In FIG.

1, a pair of voice channels 26 and 28 individual to the stations 14 and 16, respectively, are illustrated.

The central control unit 12 includes a common amplifying means 30 that forms a part of each communication path extended between a pair of calling and called stations and a talk-listen control unit 32 that is controlled from the stations to reverse the connections to the common amplifying means 30. The control unit 12 also includes a selector control means 34 that is controlled from the station over the selecting channel 22 to operate a switching means 36 to a setting in which a communication path is established through the amplifying means 30 between a calling and called pair of stations. The selector control 34 includes a bridge network having a pair of controlled conduction devices in two arms thereof. The control electrode of one of these devices is selectively connected to one of a plurality of different value impedances 38 by one deck 36*a* of the stepping switch 36, and the control electrode of the other device is connected over the selecting channel 22 to one of a plurality of different value impedance elements representing a called station by manually actuated switching means at the calling station. The selector control 34 operates a motor magnet 39 to advance the stepping switch 36 until the switch deck 36*a* selects the one of the impedance elements 38 corresponding to the impedance element selected at the calling station. At this time, a deck 36*b* of the switching means 36 establishes a connection from the call-listen control 32 and the amplifying means 30 to the voice channel individual to the called station.

Each of the stations 14, 16 includes a combined microphone-speaker or transducer unit 40 that is normally connected to the voice channel individual to the station through a switch 42*a* in a switching means 42. To control the selection of a called station, each of the stations includes a plurality of impedance elements 44 having different values representing the different stations in the system and corresponding to the values of the impedance elements 38. These elements are selected by a manually actuated switching means 46 that is connected to a normally open switch 42*b* in the switching means 42. Each of the stations also includes a talk-listen switch 48 that is connected to the talk-listen control 32 over the channel 20 to provide means by which the connection to the calling and called stations to the amplifying means 30 can be reversed from the remote station.

Assuming that a call is to be extended from the first station 14 in the system 10 to the eighth station 16, the switching means 46 is manually adjusted to its eighth setting illustrated in FIG. 1 to select the eighth impedance element 44 having a value representing the eighth station 16 that is to be called. The switching means 42 at the calling station 14 is then actuated so that the switch 42*a* connects the transducer 40 in the calling station 14 over the common voice channel 24 and the talk-listen control 32 to the output of the common amplifying means 30. The actuation of the switching means 42 also closes the switch 42*b* so that the impedance element 44 selected by the switching means 46 is connected over the selecting channel 22 to the selector control 34. This unbalances the bridge network in the control 34 so that the motor magnet 39 is pulsed to advance the switching means 36.

When the switch deck 36*a* has advanced to a position or setting in which it connects the one of the impedance elements 38 to the selector control 34 that corresponds to the impedance element 44 connected to the channel 22 at the calling station 14, the bridge network becomes balanced and further operation of the stepping switch 36 is terminated. At this time, the wiper in the switch deck 36*b* engages the contact connected to the voice channel 28 individual to the called station 16. Since the wiper of the deck 36*a* is normally connected to the input of the common amplifying means 30 through the talk-listen control 32, a communication path is now established from the transducer 40 in the called station 16 through the normal switch 42*a*, the voice channel 28 individual to the called station 16, the talk-listen control 32, the input of the amplifier 30, the output of the amplifier, the talk-listen control 32, the common voice channel 24 and the operated switch 42*a* in the calling station 14 to the transducer 40 in the calling station.

When the bridge network in the selector control 34 is initially unbalanced, a lock-out circuit therein is operated so that after a time delay long enough to cover the operation of the stepping switch 36, the bridge network is disabled to prevent a subsequent attempt to make a selection, a signal is applied to each of the individual voice channels to produce a busy indication at all of the stations in the system 10, and the amplifier 30 is enabled to permit the party at the called station 16 to speak over the established path to the party at the calling station 14. When the party at the calling station 14 wishes to speak to the called station 16, the talk-listen key 48 in either station 14 or 16 is operated to apply a signal to the common control channel 20. This signal controls the talk-listen control 32 to reverse the connection to the amplifier 30 so that the transducer 40 at the calling station 14 is connected to the input of the amplifier 30 and the transducer 40 at the called station 16 is connected to its output.

The established path can be released only from the calling station 14 by restoring the switching means 42 to its normal position to disconnect the impedance element 44 selected by the switching means 46 from the selector channel 22. This disables the lock-out means in the selector control 34 and unbalances the bridge network therein so that the magnet 39 advances the stepping switch 36 to its normal position. This restores the system 10 to its normal condition.

A detailed circuit of the system 10 is illustrated in FIGS. 2–4 in which FIG. 3 illustrates the common control unit 12 and FIGS. 2 and 4 illustrate the stations 14 and 16, respectively. The system 10 is provided with a single power supply 50 located in the common control unit 12. The power supply 50 includes a power transformer 52 having a primary winding 52*a* connected to a source of alternating current potential and a secondary winding 52*b* connected to the anodes of a fullwave rectifier tube 54. The center-tap of the secondary winding 52*b* is connected to ground, and the cathode of the tube 54 is connected to a pair of capacitors 56. A direct current operating potential for the system 10 is derived from across the capacitors 56 or across a voltage regulator tube 58.

The common amplifier means 30 includes an input transformer 58 having a primary winding 58*a* connected to the talk-listen control 32 and a secondary winding 58*b* connected through a biasing network 60 to the control grid of a first amplifier tube 62. The output of the tube 62 is capacitively coupled to the control grid of a second amplifier tube 64. An output transformer 66 includes a primary winding 66*a* coupled to the output of the tube 64 and a secondary winding 66*b* connected to the talk-listen control 32.

The talk-listen control 32 comprises a relay 68 having an operating winding connected between the regulated source of direct current potential and the common control channel 20. A pair of normally closed contacts 68*c* on the relay 68 normally connect the wiper of the switch deck 36*b* to the input transformer 58 of the amplifier 30 so that the amplifier input is adapted to be connected to the individual voice channel of the called party. A pair of normally closed contacts 68*e* normally connect the common voice channel 24 to the output transformer 66 of the amplifier. When the relay 68 is operated by the application of ground to the common control channel 20 by operating the talk-listen switch 48 to the talk position at one of the remote stations, the contacts 68*c* and 68*e* are opened and a plurality of contacts 68*d* and 68*f* are closed. The opening of the contacts 68*c* and the closing of the contacts 68*d* connect the wiper in the switch deck 36*b* to the output transformer 66 of the amplifier 30. The closure of the contacts 68*f* and the opening of the contacts 68*e* connect the common voice channel 24 to the input transformer 58 of the amplifier 30. The operation of the relay 68 also closes a pair of contacts 68*a* and then opens a pair of contacts 68*b* to apply a momentary ground to the output transformer 66 to prevent any switching transients from being applied to the voice channels. A capacitor 70 shunted across the winding of the relay 68 delays its release when the operate signal is removed from the channel 20. When the relay 68 releases, the normal connections to the amplifier 30 are restored, and the contacts 68*a* and 68*b* again apply a momentary ground to the output of the amplifier 30.

The selector control 34 includes a bridge network having four arms connected between ground and the regulated direct current potential. Two of the arms are provided by a pair of controlled conduction devices or triodes 72 and 74 whose cathodes are connected to a common grounded cathode resistor 76. The other two arms are provided by a pair of anode resistors 78 and 80 of like value connected to the anodes of the triodes 72 and 74, respectively. The control grid or electrode of the tube 74 is connected to the wiper of the switch deck 36*a* and is provided, in the normal condition of the system 10, with a fixed bias by a voltage dividing network including a pair of resistors 82 and 84. This bias is such that the tube 74 is normally in a conductive condition. The control grid or electrode of the tube 72 is connected to the common selector channel 22 and is normally provided with a fixed bias of a magnitude to place the tube 72 in a conductive condition by a voltage dividing network including a pair of resistors 86 and 88.

The current drain through the tubes 72 and 74 in the normal condition of the selector control 34 is approximately the same so that the anode potentials of these two tubes is the same. Thus, there is no current flow through the winding of a detecting relay 90 that is directly connected between these anodes in series with a pair of normally closed contacts 39*a* controlled by the motor magnet 39 of the stepping switch 36. When the current flow through the tubes 72 and 74 is unbalanced, a potential is applied across the relay 90 so that it operates to close a pair of contacts 90*a*. The closure of the contacts 90*a* connects the motor magnet 39 across the source of alternating current potential so that it operates to advance the switch 36 and to open the contacts 39*a*. The opening of the contacts 39*a* releases the relay 90 so that the contacts 90*a* open to release the motor magnet 39. This intermittent or step-by-step operation of the switch 36 continues as long as the bridge network is unbalanced to apply a potential across the winding of the relay 90.

The lock-out control means included in the selector control 34 comprises a relay 92 whose winding is connected between the potential source and the anode of a triode 94. The cathode of the triode 94 is returned to a point of lower potential in the source. The grid or control electrode of the tube 94 is connected to the common selector channel 22 and to the voltage divider provided by the resistors 86 and 88 which provide a bias that normally holds the tube 94 in a conductive condition. When the tube 94 is conducting, the relay 92 is operated to close two pairs of contacts 92*a* and 92*b* and to open a pair of contacts 92*c*. The closed contacts 92*a* normally ground the cathode resistor 76 to render the bridge network effective, and the closed contacts 92*b* normally ground the output of the common amplifier 30 to disable it.

When one of the impedances 44 in a calling station is connected to the common selector channel 22, this impedance is placed in parallel with the resistor 88 to lower the bias applied to the grid of the tube 94 to place this tube in a nonconductive condition. A capacitor 96 shunted around the winding of the relay 92 delays its release until the selecting operation of the switch 36 has been completed. At this time, the relay 92 releases to open the contacts 92*a* and 92*b* and to close the contacts 92*c*. The opening of the contacts 92*a* disables the bridge network, and the opening of the contacts 92*b* enables the amplifier 30. The closure of the contacts 92*c* applies a positive potential to all of the individual voice channels, such as the channels 26 and 28, to provide a busy indication at all of the remote stations. When the impedance 44 at the calling station is disconnected from the selector channel 22, the tube 94 returns to a conductive condition to operate the relay 92 so as to return the system to a normal condition.

The remote stations, such as the illustrated stations 14 and 16 (FIGS. 2 and 4), are connected to the common control unit 12 over the signalling link or cable 18. This link includes the three common channels 20, 22 and 24 as well as one individual voice channel for each station, such as the channels 26 and 28. The illustrated system also includes shielding for the voice channels 24, 26 and 28 which is used to provide a common ground or return path for the system 10. To provide means for initiating a call to any desired one of the stations in the system 10, each of the stations 14, 16 includes a plurality of manually actuated switch means 100 each operable to one of two different positions to call one of two different stations. The switch means 100 performs the function of the switch means 42 and 46 shown in FIG. 1.

Assuming that a call or communication path is to be extended from the station 14 (#1) to the station 16 (#8), the third switch means 100 from the left in FIG. 2 is actuated by depressing the lever 102 toward the designation "#8" so that two pair of contacts 100*a* and 100*c* are closed and a pair of normally closed contacts 100*b* are opened. The opening of the contacts 100*b* disconnects one terminal of the winding for the transducer 40 in the station 14 from the voice channel 26 individual to this station, and the closure of the contacts 100*a* connects this terminal to the common voice channel 24. This circuit includes a potentiometer 104 for adjusting the volume of the transducer 40 and a switch 106 for disabling this transducer. The closure of the contacts 100*c* connects the one of the grounded resistors or impedance elements 44 that represents the called station 16 to the common selecting channel 22.

When the impedance element 44 is connected to the selector channel 22 by the switch means 100, this impedance is placed in parallel with the resistor 88 (FIG. 3) so that the bias applied to the control grids of the tubes 94 and 72 is reduced. This terminates or releases conduction through the tube 94 so that the winding of the relay 92 is not sufficiently energized. However, the capacitor 96 discharges through the winding of this relay to prevent its release at this time. The reduced bias applied to the tube 72 also reduces conduction therethrough so that its anode potential rises to place an operating potential across the winding of the relay 90. The relay 90 operates to close the contacts 90*a* so that the motor magnet 39 is energized from the alternating current potential source. The operation of the magnet 39 opens the contacts 39*a* to release the relay 90 so that the contacts 90*a* are opened to release the motor magnet 39. The operation and release of the motor magnet 39 advances the wiper in both decks 36*a* and 36*b* of the switch 36 a single step.

The wiper of the switch deck 36*a* now connects a first one of the impedance elements 38 in parallel with the resistor 84 to reduce the bias applied to the control grid of the tube 74. If the value of the impedance 38 now connected to the grid of the tube 74 is the same as that of the impedance 44 connected to the grid of the tube 72, the current flow through the two tubes 72 and 74 is substantially equal and an operating potential is no longer applied across the relay 90. Since the impedance element 38 connected to the last contact of the deck 36*a* has a value corresponding to that of the selected impedance 44 assigned to the station 16, an operating potential remains applied across the winding of the relay 90. Thus, the relay 90 and the motor magnet 39 operate and release in synchronism until the switch 36 has advanced to its last position in which the wiper in the switch deck 36*a* connects the proper impedance 38 to the grid of the tube 74. The operating potential is now removed from the relay 90 to prevent is reoperation.

The wiper in the switch deck 36*b* now energizes the contact connected to the voice channel 28 individual to the called station 16 to complete a path from the input transformer 58 through the closed contacts 68*c*, a coupling capacitor 108, the channel 28, a blocking capacitor 110 (FIG. 4) in the called station 16, a series of closed contacts 100*b* in the switching means 100, the potentiometer 104, and the switch 106 to one terminal of the transducer 40 in the called station 16. Since the transducer 40 in the calling station 14 is connected to the output transformer 66 over the common voice channel 24, the party at the called station 16 is connected to the calling party over the signalling link 18 and the common amplifier 30.

When the relay 92 (FIG. 3) releases, the contacts 92*a* open to terminate conduction through the tubes 72 and 74 and disable the bridge network, and the contacts 92*b* open to remove the ground shunt from the output transformer 66 and permit communication over the established path from the called station 16 to the calling station 14. The closure of a pair of contacts 92*c* when the relay 92 releases forwards a positive potential through a plurality of resistors 112 to each of the individual voice channels, such as the channels 26 and 28. This potential is applied through a resistor 114 to illuminate a lamp 116 in each of the stations to provide a visible busy indication.

The direction of transmission between the calling station 14 and the called station 16 can be reversed by operating the talk-listen switch 48 at either of the stations 14 and 16. When the switch 48 (FIGS. 2 and 4) is operated, two pairs of contacts 48*a* and 48*b* are momentarily closed to short the terminals of the transducer 40. The operation of the switch 48 also closes a pair of contacts 48*c* to apply ground to the common control channel 20. This operates the relay 68 (FIG. 3) so that the connections of the amplifier 30 to the established voice communication path are reversed. When the operated switch 48 is released, the relay 68 releases to restore the prior connection of the amplifier 30.

The system 10 remains in this condition until the operated switch means 100 in the calling station 14 is restored to a released position to close the contacts 100*b* and to open the contacts 100*a* and 100*c*. The opening of the contacts 100*c* disconnects the impedance 44 from the common selector channel 22 so that the tube 94 is again placed in a conductive condition to operate the relay 92. The relay 92, in operating, closes the contacts 92*b* to ground the output of the amplifier 30 and opens the contacts 92*c* to remove the busy indication. The contacts 92*a* are closed to enable the bridge network. Since no impedance elements 44 are now connected to the grid of the tube 72 and one of the impedances 38 is connected to the grid of the tube 74, the bridge network is unbalanced to advance the switch 36 in the manner described above. The operation of the switching means 36 is terminated when the wiper of the switch deck 36*a* returns to a normal setting in which an impedance element 38 is not connected to the grid of the tube 74. In this normal position, the capacitor 108 is discharged through a resistor 120.

Although the present invention has been described with reference to one illustrative embodiment thereof, many other modifications and embodiments can be derived by those skilled in the art that will fall within the spirit and scope of the principles of this invention.

What is claimed as new and desired to be secured by Letters Patent of the United States is:

1. An intercommunication system comprising a plurality of stations, a common control until remote from said stations, a signaling link including one voice channel common to all of said stations and a plurality of other voice channels each individual to one of said stations, said signaling link connecting said stations to said common control unit, amplifying means in said control unit common to all of said stations, station selector means in said control unit operable from a calling one of said stations for establishing a communication path from said calling station to a called one of said stations, said communication path including said common voice channel connected between one of said calling and called stations and said common amplifying means and one of said individual voice channels connected between said common amplifying means and the other of said calling and called stations.

2. An intercommunication system comprising a plurality of stations, a common control unit remote from said stations, a signaling link including one voice channel common to all of said stations and a plurality of other voice channels each individual to one of said stations, said signaling link connecting said stations to said common control unit, switching means in each of said stations normally connecting the station to the voice channel individual to the station and operable to connect a calling station to the common voice channel, amplifying means in said control unit common to all of said stations, and station selecting means in said common control unit controlled from a calling station for connecting said calling station over said common voice channel to said common amplifying means and from said common amplifying means to a called one of said stations over the one of the plurality of voice channels that is individual to the called station.

3. The intercommunication system set forth in claim 2 including different impedances at each station for each of the other stations and impedance responsive means in said common control unit for controlling the operation of said selecting means, and a plurality of manually selectable impedance means at each of said stations for controlling the operation of said impedance responsive means over said signaling link.

4. An intercommunication system comprising a plurality of stations, a common control means remote from said stations and including an amplifying means common to all of said stations, a signaling link connecting said plurality of stations to said common control means, said signaling link including a selecting channel and a voice channel, station selecting means in said common control means operable from a called station for establishing a communication path from a calling one of said stations to a called one of said stations that includes said voice channel and said amplifying means, means in each of said stations for supplying called station selecting signals to said selecting means over said selecting channel, and means in said common control means controlled by signals received from said selecting channel for selectively controlling communication over said voice channel.

5. An intercommunication system comprising a plurality of stations, a common control means remote from said stations, a signaling link interconnecting said plurality of stations and said common control means, said signaling link including a selecting channel and a voice channel, station selecting means in said common control means operable from a called station for extending a communication path over said voice channel between a calling one of said stations and a called one of said stations, means in each of said stations for supplying signals over said selecting channel to control the operation of said selecting means, and circuit means in said common control means for automatically rendering said selecting means responsive to signals received from said selecting channel and responsive to signals received from said selecting channel for disabling said selecting means until the release of an established communication path.

6. An intercommunication system comprising a plurality of stations; common control means remote from said stations and including an amplifier common to all of said stations; a signaling link interconnecting all of said stations and said common control means, said signaling link including a control channel common to all of said stations, a voice channel common to all of said stations, and a plurality of other voice channels each individual to one of said stations; station selecting means in said common control means operable from a called station for establishing a communication path between two of said stations, said communication path including said amplifying means, said common voice channel, and the voice channel individual to one of said two stations; and means in said common control means operable from either of said two stations over said control channel for changing said established path by reversing the connection of said common voice channel and said one voice channel to said amplifying means.

7. The system set forth in claim 6 including means in said common control means and operable over all of said individual voice channels for providing a busy indication at all of said stations when said communication path is established.

8. An intercommunication system comprising a plurality of stations; a common control unit remote from said stations; a signaling link connecting said plurality of stations to said common control unit, said signaling link including a voice channel and a selecting channel common to all of said stations; amplifying means common to all of said stations in said common control unit; selecting means in said common control unit for connecting a calling one of said stations to a called one of said stations over said voice channel and said amplifying means; impedance responsive control means in said control unit for controlling the operation of said selecting means; a plurality of impedance elements of different values in each of said stations each representing a different one of the stations; and manually actuated switching means in each of said stations for selectively connecting the impedance element representing a called one of said stations to the selecting channel to control the selecting means in the control unit to select the called station represented by the selected impedance element.

9. The intercommunication system set forth in claim 8 including busy means in said common control unit responsive to the selection of the called station and operative over the signaling link for producing a busy indication at all of the stations.

10. An intercommunication system comprising a plurality of stations; a control unit remote from said stations; a signaling link connecting said control unit to said plurality of stations, said signaling link including one voice channel individual to each of the stations, one voice channel common to all of the stations, and one selection channel common to all of said stations; amplifying means in said control unit and having input and output means; selecting means in said control unit controllable over said selection channel from a calling one of said stations for establishing a communication path over said link by connecting said calling station to one of the terminal means of said amplifying means and a called one of said stations to the other terminal of said amplifying means, said path including one of said individual voice channels and said common voice channel; and means in said control unit controlled by said selecting means and operable over all of said individual voice channels for producing a busy indication at all of said stations when said selecting means selects the called one of said stations.

11. The intercommunication system set forth in claim 10 in which said signaling link includes a fourth channel common to all of said stations and in which said control unit includes means operable from said stations over said fourth channel for changing the connections between the terminal means in the amplifier means and the voice channels used in the established communication path.

12. An intercommunication system comprising a plurality of stations, a common control means remote from said stations, a signaling link interconnecting said plurality of stations and said common control means, said signaling link including a selecting channel and a voice channel, switching means for controlling the establishment of a communication path over said voice channel between calling and called ones of said stations, a bridge network for controlling the operation of said switching means and including a pair of controlled conduction devices each having a control electrode, means including said switching means for connecting different values of impedance to the control electrode of one of said controlled conduction devices, means connecting the control electrode of the other controlled conduction device over said selecting channel to all of said stations, and means in each of said stations for connecting different value impedances to said selecting channel in accordance with the station to be called.

13. The intercommunication system set forth in claim 12 including means in said common control means controlled by the connection of an impedance to said selecting channel at one of said stations for preventing the control of said bridge network by any impedances subsequently connected to said selecting channel at said stations.

14. In an intercommunication system, a plurality of stations, means including switching means operable to a plurality of different settings for establishing a communication path between a selected pair of said stations, a bridge network operable to an unbalanced condition upon a call from a calling to a called station, relay means connected across said bridge network for effecting operation of said switching means to interconnect said called and calling stations, and means controlled by said switching means for controlling the connection of said relay means to the bridge network.

15. The system set forth in claim 14 in which said switching means includes drive means and contacts controlled by said drive means for controlling the connection of said relay means across said bridge network.

16. An intercommunication system comprising a plurality of stations, each of said stations including both a plurality of impedance means of different values representing the other stations and manually operable means for selecting one of the impedance means in accordance with the station to be called; a control unit remote from said stations; a signaling link connecting said control unit to said plurality of stations, said signaling link including one voice channel individual to each of the stations, one voice channel common to all of the stations, one talk-listen channel common to all of the stations, and one selection channel common to all of said stations to which the called station representing impedance means at the calling station can be connected; amplifying means in said control unit and having input and output means; selecting means in said control unit controllable over said selection channel from a calling one of said stations for establishing a communication path over said link by connecting said calling station to one of the terminal means of said amplifying means and a called one of said stations to the other terminal of said amplifying means, said path including one of said individual voice channels and said common voice channel, said selecting means including a switching means operable to more than two different settings, a normally balanced bridge network connected to the selection channel and placed in an unbalanced condition by the impedance means connected to the selection channel by the calling station, and means connecting the bridge network to the switching means for controlling the operation of the switching means to one of its settings in which the bridge is rebalanced; means in said control unit controlled by said selecting means and operable over all of said individual voice channels for producing a busy indication at all of said stations when said selecting means selects the called one of said stations; and means in the control unit operable from said stations over said fourth channel for changing the connections between the terminal means in the amplifier means and the voice channels used in the established communication path.

References Cited by the Examiner

UNITED STATES PATENTS

| | | | |
|---|---|---|---|
| 1,343,256 | 6/20 | Field. | |
| 2,470,590 | 5/49 | Tschumi | 179—1 |
| 3,035,250 | 5/62 | Durkee et al. | 179—90 |
| 3,103,557 | 9/63 | Serotta | 179—37 |

ROBERT H. ROSE, *Primary Examiner.*